United States Patent
Nadeau et al.

(10) Patent No.: US 9,450,854 B2
(45) Date of Patent: Sep. 20, 2016

(54) PASS-THROUGH TEST DEVICE

(71) Applicant: EXFO INC., Quebec (CA)

(72) Inventors: Sylvain Nadeau, Vaudreuil-Dorion (CA); Sébastien Prieur, Laval (CA); Dominic Lapierre, Rigaud (CA)

(73) Assignee: EXFO Inc., Quebec (CA)

( * ) Notice: Subject to any disclaimer, the term of this patent is extended or adjusted under 35 U.S.C. 154(b) by 68 days.

(21) Appl. No.: 14/212,144

(22) Filed: Mar. 14, 2014

(65) Prior Publication Data

US 2014/0301221 A1 Oct. 9, 2014

Related U.S. Application Data

(60) Provisional application No. 61/783,524, filed on Mar. 14, 2013.

(51) Int. Cl.
*H04L 12/26* (2006.01)

(52) U.S. Cl.
CPC ............. *H04L 43/50* (2013.01); *H04L 43/12* (2013.01)

(58) Field of Classification Search
CPC ............. H04L 43/50; H04L 12/2697; H04L 41/0806; H04L 41/145; H04L 43/026; H04L 43/062; H04L 43/106; H04L 43/12; G06F 11/2294
See application file for complete search history.

(56) References Cited

U.S. PATENT DOCUMENTS

| | | |
|---|---|---|
| 7,085,958 B2 | 8/2006 | El-Batal |
| 7,222,313 B2 | 5/2007 | Bullis et al. |
| 7,281,167 B2 | 10/2007 | Dubé |
| 7,488,121 B2 | 2/2009 | Dugan |

(Continued)

FOREIGN PATENT DOCUMENTS

| | | |
|---|---|---|
| CA | 2733344 | 9/2012 |
| CA | 2774849 | 10/2012 |

(Continued)

OTHER PUBLICATIONS

Accedian Networks,"Accedian Launches NanoNID—the World's Most Compact Service Assurance Solution", Reuters, Online Press Release, Oct. 18, 2012.

(Continued)

*Primary Examiner* — Ayaz Sheikh
*Assistant Examiner* — Debebe Asefa
(74) *Attorney, Agent, or Firm* — Gowling WLG LLP; Benoit Yelle

(57) ABSTRACT

Method and test device for performing testing in a network conveying a plurality of traffic flows. At the test device, receiving traffic flows through a first interface of the test device on a first segment and forwarding the received plurality of traffic flows towards a second segment of the network through a second interface. At the test device, receiving a test request directed to an address of a test module and, in response to the test request, causing a sequence of proprietary traffic to be injected on the second segment. A reprogrammable test device comprising a networked test module at least in part on a reprogrammable partition of a programmable logic device and a reprogramming module, on a static partition of the programmable logic device, for reprogramming at least a portion of the reprogrammable partition implementing the test module in accordance with reprogramming data received at the test device.

31 Claims, 4 Drawing Sheets

(56) References Cited

U.S. PATENT DOCUMENTS

| | | |
|---|---|---|
| 7,610,408 B2 | 10/2009 | Jones |
| RE41,147 E | 2/2010 | Pang et al. |
| 7,657,177 B2 | 2/2010 | Healy et al. |
| 7,668,512 B2 | 2/2010 | Woolf et al. |
| 7,707,470 B2 | 4/2010 | Doris et al. |
| 7,805,514 B2 | 9/2010 | Yang |
| 7,873,057 B2 | 1/2011 | Robitaille et al. |
| 8,139,494 B2 | 3/2012 | Robitaille et al. |
| 8,254,781 B2 | 8/2012 | Lindsay et al. |
| 8,345,703 B2 | 1/2013 | Heinkel et al. |
| 8,654,790 B2 * | 2/2014 | Haver et al. ............ 370/474 |
| 8,797,880 B2 * | 8/2014 | Li et al. ............ 370/241 |
| 8,982,726 B2 | 3/2015 | Davari |
| 9,300,562 B2 | 3/2016 | Dufour et al. |
| 2003/0021552 A1 | 1/2003 | Mitchell |
| 2005/0041933 A1 | 2/2005 | Meadowcroft et al. |
| 2005/0049976 A1 | 3/2005 | Yang |
| 2006/0209886 A1 | 9/2006 | Silberman et al. |
| 2006/0291857 A1 | 12/2006 | Mackenzie et al. |
| 2008/0159737 A1 | 7/2008 | Noble et al. |
| 2009/0109973 A1 | 4/2009 | Ilnicki |
| 2009/0162057 A1 | 6/2009 | Friedrich et al. |
| 2010/0061732 A1 | 3/2010 | Lavoie |
| 2011/0134988 A1 | 6/2011 | Chen et al. |
| 2011/0182191 A1 | 7/2011 | Jackson |
| 2011/0262147 A1 | 10/2011 | Lavoie et al. |
| 2012/0051738 A1 | 3/2012 | Skirmont et al. |
| 2012/0218879 A1 | 8/2012 | Robitaille et al. |
| 2012/0226458 A1 | 9/2012 | Lavoie et al. |
| 2012/0257103 A1 | 10/2012 | Lavoie et al. |
| 2012/0301134 A1 | 11/2012 | Davari et al. |
| 2013/0196549 A1 | 8/2013 | Sorani |
| 2013/0210275 A1 | 8/2013 | Fish et al. |
| 2013/0250813 A1 | 9/2013 | Janz |
| 2014/0016479 A1 | 1/2014 | Coomber et al. |
| 2014/0024255 A1 | 1/2014 | Robitaille et al. |

FOREIGN PATENT DOCUMENTS

| | | |
|---|---|---|
| EP | 1684446 | 7/2006 |
| EP | 1684446 A2 * | 7/2006 |

OTHER PUBLICATIONS

JDSU, "How Packet Portal Works", JDSU Online White Paper, Feb. 2012 (Feb. 1, 2012).

Unknown Author, "NanoNID, Accediant", http://www.accedian.com/en/products/nanonid.html, extracted on Jan. 14, 2013, pp. 1-5.

Unknown Author, "JDSU PacketPortal Solution, Communications test & Measurement Solutions", http://www.jdsu.com/test, extracted on Jan. 14, 2013, pp. 1-12.

Unknown Author, "JDSU Ethernet Service OAM, White paper, Standards and Functionality", http://www.jdsu.com, extracted on Jan. 14, 2013, pp. 1-5.

Unknown Author, "MINID Ethernet Demarcation SFP, RAD Data communications Ltd.", http://www.rad.com/10/Ethernet-Demarcation-SFP/24944/, extracted on Jan. 14, 2013, pp. 1-3.

Unknown Author, "Embrionix, EB60LC2R-MN, ASI/SD/HD/3G-SDI SFP (emSFP) Optical Dual Receiver , Medium Haul, non-MSA", http://www.embrionix.com/products/ProductDetails.aspx?id=bd8ff0c5-25a0-4140-902d-d212e74c9986, extracted on Jan. 14, 2013, p. 1.

International Search Report of PCT/CA2014/000270 mailed on Jul. 3, 2014.

* cited by examiner

PASS-THROUGH TEST DEVICE

PRIORITY STATEMENT

This non-provisional patent application claims priority based upon the prior U.S. provisional patent application entitled "PASS-THROUGH TEST DEVICE", application No. 61/783,524, filed 2013 Mar. 14, in the name of EXFO INC., which is incorporated herein by reference in its entirety.

TECHNICAL FIELD

The present invention relates to network testing and, more specifically, to methods and devices for testing networks without interrupting live traffic.

BACKGROUND

Contemporary communications network service-testing methodologies normally rely on dedicated test equipment (portable or rack mount) installed at specific locations, e.g., throughout an Ethernet network. Elements of such test equipment usually are employed for end-to-end service testing and are typically located on the edge of the network or at customer premises. Some other network equipment may also offer monitoring capacity.

The present invention addresses a need for versatile test equipment that does not interrupt live traffic.

SUMMARY

A first aspect of the present invention is directed to a test device connectable in a network node of a network conveying a plurality of traffic flows. The test device comprises a first interface, a second interface and a test module. The first interface is for receiving the plurality of traffic flows on a first segment of the network. The second interface is for forwarding the plurality of traffic flows received from the first interface towards a second segment of the network. The test module is reachable via an address on the network. The test module receives a test request directed to the address and causes a sequence of proprietary traffic to be injected on the network.

Optionally, the test device may further comprise a queue manager that receives the plurality of traffic flows from the first interface, receives the sequence of proprietary traffic from the test module and directs the plurality of traffic flows and the sequence of proprietary traffic to the second interface while minimizing involuntary network degradation for the plurality of traffic flows.

The test device may further optionally receive inline power connectivity from the network node via the first interface and provide inline power connectivity to a network device via the second interface.

The first interface, the second interface and, if present, the queue manager may optionally be further implemented on a static partition of a programmable logic device and the test module may further be implemented at least in part on a reprogrammable partition of the programmable logic device. A reprogramming module may further optionally be implemented on the static partition of the programmable logic device. The test module may then optionally receive reprogramming data (e.g., FPGA bit stream or image (partial or complete) present in the test request or in another message) and the reprogramming module may then further optionally reprogram at least a portion of the reprogrammable partition in accordance with the reprogramming data. The sequence of proprietary traffic may further be generated by the test module after reprogramming of the reprogrammable partition.

The first interface may optionally serve to receive the plurality of traffic flows on the first segment from the network node.

The test module may, in response to the injected sequence of proprietary traffic, optionally receive a response directed to the address. The second segment may further comprise a network segment and the response may thus relate to the network segment. The test module may also optionally further treat the response and send a test result to an issuer of the test request.

The sequence of proprietary traffic may additionally comprise further reprogramming data addressed to a further physical address of a further test module in a further test device.

The test module may also receive a further sequence of proprietary traffic.

The sequence of proprietary traffic may also be injected on a subset of the plurality of traffic flows on the second segment without interrupting other traffic flows from the plurality of traffic flows that are not part of the subset.

The sequence of proprietary traffic may also be injected on a new traffic flow on the second segment without interrupting the plurality of traffic flows.

A second aspect of the present invention is directed to a method for performing testing in a network conveying a plurality of traffic flows. The network comprises a network node in which a test device is connected. The method comprises, at the test device, receiving the plurality of traffic flows through a first interface of the test device on a first segment of the network and forwarding the plurality of traffic flows received from the first interface towards a second segment of the network through a second interface of the test device. The method also comprises, at the test device, receiving a test request directed to an address of a test module of the test device and in response to the test request, causing a sequence of proprietary traffic to be injected on the network.

Optionally, the method may also comprise, in the test device, receiving the plurality of traffic flows from the first interface and the sequence of proprietary traffic from the test module in a queue manager and directing the plurality of traffic flows and the sequence of proprietary traffic to the second interface from the queue manager while minimizing involuntary network degradation for the plurality of traffic flows.

Optionally, the method may also comprise, at the test device, receiving inline power connectivity from the network node via the first interface and providing inline power connectivity to a network device via the second interface.

Optionally, the first interface, the second interface and, if present, the queue manager may be further implemented on a static partition of a programmable logic device in the test device and the test module may be further implemented at least in part on a reprogrammable partition of the programmable logic device.

Optionally, the method may also comprise, in the test device, reprogramming at least a portion of the reprogrammable partition in accordance with the reprogramming data. In this exemplary scenario, causing a sequence of proprietary traffic to be injected on the second segment may then further comprise generating the sequence of proprietary traffic in the test module after reprogramming of the reprogrammable partition.

Optionally, receiving the plurality of traffic flows may further comprise receiving the plurality of traffic flows from the network node.

Optionally, the method may also comprise, in response to the injected sequence of proprietary traffic, receiving a response directed to the address at the network device. Then, the method may also comprise, at the test device, treating the response and sending a test result to an issuer of the test request.

Optionally, the method may also comprise, receiving further reprogramming data in the test request and forwarding the further test request to a further address of a further test module in a further test device Optionally, the method may also comprise, receiving a further sequence of proprietary traffic at the test device.

Optionally, the method may also comprise, at the test device, injecting the sequence of proprietary traffic on a subset of the plurality of traffic flows on the second segment without interrupting other traffic flows from the plurality of traffic flows that are not part of the subset.

Optionally, the method may also comprise, at the test device, injecting the sequence of proprietary traffic on a new traffic flow on the second segment without interrupting the plurality of traffic flows.

A third aspect of the present invention is directed to a test device connectable in a network node of a network conveying a plurality of traffic flows. The test device comprises a first interface for receiving the plurality of traffic flows on a first segment of the network and a second interface for forwarding the plurality of traffic flows received from the first interface towards a second segment of the network. The test device further comprises a test module, reachable via an address on the network, implemented at least in part on a reprogrammable partition of a programmable logic device of the test device, for performing at least one test function on the plurality of traffic flows, and a reprogramming module, implemented on a static partition of the programmable logic device, for reprogramming at least a portion of the reprogrammable partition implementing the test module, in accordance with reprogramming data received at the test device.

In accordance with one optional feature, the test device receives inline power connectivity from the network node via the first interface and provides inline power connectivity to a network device via the second interface.

Optionally, the reprogramming data may allow the test module to provide at least one of the following test functions on the traffic flows: traffic flow monitoring, traffic flow mirroring, proprietary traffic injection on the traffic flows and/or proprietary traffic analysis on the traffic flows.

Optionally, the reprogramming data allows the test module to provide at least one test function not provided before reprogramming. At least one test function (or all test function) provided by the test module before reprogramming may further not be available after reprogramming.

Optionally, the reprogramming module may further acknowledge completion of the reprogramming to at least one of a sender of the reprogramming data and, if different than the sender, a test management system.

Optionally, a sequence of proprietary traffic (e.g., proprietary test traffic) may also be generated by the test module after reprogramming comprising further reprogramming data addressed to a further address of a further test device (e.g., allowing a daisy-chain of test device reprogramming).

Optionally, the first interface and the second interface may further be implemented on the static partition of the programmable logic device.

Optionally, the test module may further receive a test request directed to the address and cause a sequence of proprietary traffic (e.g., proprietary test traffic) to be injected on the network. The sequence of proprietary traffic may further be generated by the test module after reprogramming of the reprogrammable partition.

BRIEF DESCRIPTION OF THE DRAWINGS

Further features and exemplary advantages of the present invention will become apparent to the skilled person from the following detailed description, taken in conjunction with the appended drawings, in which.

DETAILED DESCRIPTION

Figure 1:
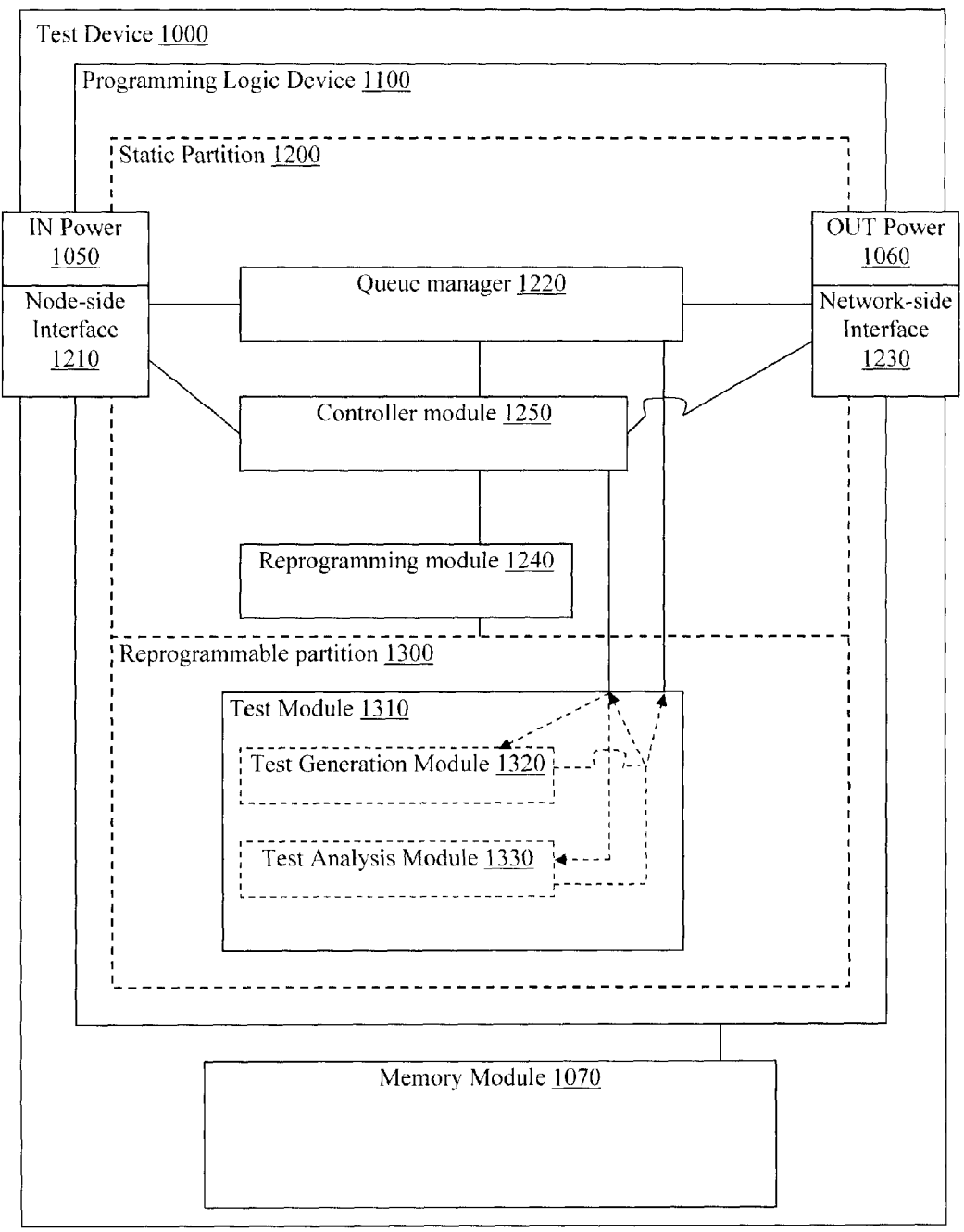
FIG. 1 is a first modular representation of a test device in accordance with an exemplary embodiment.

There is provided a test device positioned on a communication segment that allows live traffic to pass therethrough with minimal impact while still enabling test sequences to be generated on the segment. The test device, depending on choices made in its implementation, aims at providing at least one exemplary advantage such as minimal impact on live traffic, remote manageability/troubleshooting/reprogrammability (e.g., without requiring physical presence at the device), avoiding the need for additional chassis/additional dedicated network equipment, segmentation of the test procedure, low power consumption (cannibalizing of existing interfaces), etc.

Service testing methodologies are typically relying on dedicated test equipment (portable or rack mount) installed at specific locations through the Ethernet network. This test equipment is used for end-to-end service testing and is typically located on the edge of the network or at customer premises. The typical setup is convenient as long as the test does not reveal existing or potential problems. If problems are detected by the test procedure, then it becomes necessary to identify which of the one or more segments of the network may be at cause. Although monitoring capacity may be embedded within some network equipment, such monitoring capacity is typically not accessible by "service turn-up" test instrumentation. In addition, such monitoring capacity typically does not permit the injection of traffic and the monitoring of injected traffic in the network or at specific points in the network.

In order to distribute the testing capacity on all segments (e.g., of an Ethernet network), a solution is to directly provide test capacity on the already installed network equipment using test devices inserted throughout the network. For instance, each test device can take the form of a unit for insertion inside the cage of an optical module (such as one providing a Small Form-Factor (SFP) interface), or as a separate device to be used as an extension of the optical module that is to be inserted between the equipment connectors and the optical module. Each test device could provide turn-up and in-service performance testing on segments of a network and could be fully controllable remotely. The insertion of such test devices throughout a network may add visibility and controllability points in the network without additional infrastructure. This may also improve the troubleshooting capacity without requiring on-site presence.

In one exemplary embodiment, a test device operates in transparent mode by default, i.e., where all live traffic flows normally therethrough without intrusion. When needed (e.g., upon request), the test device may inject and monitor proprietary traffic (e.g., proprietary test traffic) to accomplish turn-up and/or in-service performance testing functions. The live traffic may be interrupted to isolate segments momentarily, if needed. The test device has one or multiple network presences to be accessed for management purpose and to transmit and/or receive traffic. The test device may be fully controllable and upgradable remotely (e.g., via a Test Set management system). The test configuration and results are conveyed over the network under test.

In one exemplary embodiment, programmable logic technology, such as Field-Programmable Gate Array (FPGA) technology, is used to provide real-time processing capacity and field upgradable capability. The FPGA technology is sufficiently small and has sufficiently low power consumption that a test device circuit can fit in a SFP interface of a cage and respect expected power consumption limits. Also, remote partial reprogramming may be provided to change the FPGA functionality without interrupting the live traffic transiting through a static portion of the FPGA. A complete or partial image required for the reprogrammable portion of the FPGA may be sent to one or more test devices via the network under test. This allows on-demand adaptation of the real-time processing functionality of the relevant test device(s) to various test applications. Reprogramming data required by the test device to reprogram itself may be sent by a test management system (e.g., via a test request or as a separate message) to turn the test device into a test generation device, a test analysis device or both a test generation and analysis device (e.g., based on logic complexity of the circuit required to act as a test generation and/or a test analysis device).

Reference is now made to the drawings. FIG. 1 shows a modular representation of a test device 1000 in accordance with an exemplary embodiment. The test device 1000 is connectable in a network node (not shown on FIG. 1) of a network (not shown) conveying a plurality of traffic flows. Skilled persons will readily understand that the terminology used throughout the present description is meant to illustrate the present invention and not to restrict its use to the described context. For instance, traffic flows could represent packet flows, service flows or Ethernet frame flows, including any type of encapsulation such as Virtual Local Area Network (VLAN), Multiprotocol Label Switching (MPLS), Virtual Private Network (VPN), or tunneling. In the present context, a segment or a network segment may represent a link between two network nodes or a link between two ports within a network node, for instance. The link itself is likely a single physical connection, but may also comprise more than one physical connections that are perceived, from a given network layer, as a single connection. The test device 1000 itself may be referred to as a test set that can be used, for example, in service turn-up, service monitoring, service surveillance or troubleshooting. Skilled persons will readily understand that the actual stacks of protocols used by the interfaces and/or logical interfaces of the test device 1000 do not affect the present teachings.

The test device as illustrated in FIG. 1 comprises a memory module 1070 used to store and/or retrieve information as needed by the test device 1000. The memory module 1070 may be implemented using various types of memory (different standardized or kinds of Random Access Memory (RAM) modules, memory cards, Read-Only Memory (ROM) modules, programmable ROM, etc.). Even though explicit mentions of the memory module 1070 and/or other modules of the test device 1000 are not made throughout the description of the present examples, persons skilled in the art will readily recognize that such modules are used in conjunction with other modules of the test device 1000 to perform routine as well as innovative steps.

The test device 1000 comprises a first interface 1210, a second interface 1230 and a test module 1310. The exemplary test device 1000 illustrated in FIG. 1 also comprises a queue manager 1220 that ensures continued treatment of live traffic flows and a controller module 1250 that allows the test device to maintain a presence on the communications network and allows other general functions of the test device 1000 to be performed. In the example of FIG. 1, the first interface 1210 allows the test device 1000 to connect to a port of the network node and is therefore referred to as the node-side interface. Although it is technically feasible to provide or configure the test device to be unidirectional, the first interface 1210 is meant to be bi-directional and allow traffic flows to be exchanged with the network node. Likewise, the second interface 1230 is meant to provide bidirectional connectivity for a modular transceiver (e.g., Small Factor Pluggable (SFP), SFP+ or XFP transceivers) and is therefore referred to as the network-side interface. It will be readily understood that the role of the interfaces 1210 and 1230 could also be inverted. More than one test device 1000 could also be daisy-chained in the port of the network node (e.g., one for each direction), as long as the overall performance of the arrangement is within expected tolerances (e.g., power usage, network degradation, etc.).

Skilled persons will recognize that the test device 1000 could also be used with other types of modular technologies (transceivers or unidirectional modules). The network-side 1230 can forward traffic flows received from the node-side interface 1210 towards a segment (not shown) of the network via the queue manager 1220 and is expected to receive traffic flows (not shown) from the network and direct the received traffic flows towards the node-side interface 1210 via the queue manager 1220. The test module 1310 of the test device 1000 is reachable via an address (not shown) on the network. In the example of FIG. 1, the address is assigned to the controller module 1250 that maintains a presence on the network and allows the test module 1310 to be reachable thereon.

In the example of FIG. 1, the test module 1310 is illustrated with a test generation module 1320 and a test analysis module 1330. As required by a given test, the test module 1310 may comprise the test generation module 1320, the test analysis module 1330 or both the test generation module 1320 and the test analysis module 1330 (e.g., based on logic complexity of the circuit required). When the test module 1310 receives a test request (not shown) directed to the address (e.g., via the controller module 1250), the test generation module 1320 causes a sequence of proprietary traffic (e.g., proprietary test traffic; not shown) to be injected on the network. For instance, the sequence of proprietary traffic can be sent to the controller module 1250 or to the queue manager 1220. The test request can be received via the node-side interface 1210 or the network-side interface 1230 and the sequence of proprietary traffic can be injected towards the node-side interface 1210 or network-side interface 1230, irrespectively of the receiving interface (e.g., with or against the reception flow). The sequence of proprietary traffic, or proprietary test traffic, may be used to perform a test, which may serve to, for instance, measure several service key performance indicators (KPI) on one or more segment, such as packet delay, packet delay variation, frame loss, bit error rate, etc. The test may also serve to execute regular or standard tests such as those prescribed by ITU-T Y.1564, RFC 2544, etc.

The test module 1310 may also receive a further sequence of proprietary traffic (e.g., proprietary test traffic), for instance, from another test device (not shown). In the example of FIG. 1, the controller module 1250 receives the further sequence of proprietary traffic at the address or detects the further sequence of proprietary traffic on the traffic flows (e.g., via a traffic filtering module (not shown)). The controller module 1250 then directs the further sequence of proprietary traffic to the test module 1310. The test analysis module 1330 receives the further sequence of proprietary traffic and treats it accordingly (e.g., by a measurement module (not shown)) and thereafter returns a result (e.g., addressed to a test management system) and makes the result available either to the controller module 1250 or to the queue manager 1220. The result is likely addressed to the issuer of a corresponding test request (e.g., addressed to a test management system), but may also be addressed as a response to the test device that sent the further sequence of proprietary traffic (e.g., for additional test or additional treatment). The result may or not be further treated by the controller module 1250 and/or the queue manager 1220 before being sent via the node-side interface 1210 or the network-side interface 1230.

For the purpose of illustration, the test module 1310 may provide different test functions such as traffic flow monitoring, traffic flow mirroring, proprietary traffic (e.g., proprietary test traffic) injecting and/or proprietary traffic (e.g., proprietary test traffic) analyzing. More particularly, the traffic flow monitoring test function could involve sending different measurements (e.g. performance statistics) taken at the test module 1310 to a remote monitoring server. For example, the measurements could relate to performance on all packets that fit a particular WAN, application specific performance (e.g., Facebook™ traffic, Google™ traffic, etc.), per-filter measurements (e.g., throughput, jitter, etc.), transport analysis (e.g., TCP/UDP performance per socket), congestion correlation, security analysis (e.g., identify congestion cascades and allow for a proper reaction before a subsequent eventual impact), etc. The traffic flow mirroring test function could more particularly involve, for instance, configuring filters for traffic of interest to be mirrored to a given destination (e.g., mirrored traffic encapsulated in IP and sent to another device for testing or other purposes). The mirrored traffic could also alternatively be captured and be made available. The traffic flow mirroring test function could be used in the exemplary contexts of a mobile backhaul (e.g., signaling traffic being mirrored to a protocol analyzer such as EXFO TravelHawk™), of triple play analysis (e.g., VoIP/Video traffic mirrored to a service assurance measurement probe such as EXFO Brix Verifiers™) or of troubleshooting where traffic of interest is capture and decoded.

The exemplary test functions may be more particularly provided by the test generation module 1320 and/or the test analysis module 1330. In some embodiments, the test functions are available through the test module 1310 in relation to received reprogramming data. More specifically, an installed test device 1310 may be unable to provide one or more test functions until the necessary reprogramming data is received. The reprogramming data may allow for addition and/or removal of one or more test functions from the test module 1310 (e.g., by implementing the test generation module 1320 and/or the test analysis module 1330), as will be further explained hereinbelow.

In the example illustrated in FIG. 1, the queue manager 1220 receives the traffic flows from the node-side interface 1210 and the network-side interface 1230, receives the sequence of proprietary traffic from the test module 1310 and directs the traffic flows and the sequence of proprietary traffic to the node-side interface 1210 and/or network-side interface 1230 while minimizing involuntary network degradation for the plurality of traffic flows. In one embodiment, priority is given to the traffic flows that correspond to live traffic over the sequence of proprietary traffic in order to avoid involuntary network degradation for the plurality of traffic flows. However, in order for the sequence of proprietary traffic to be used to obtain useful results, minimum network requirements for the sequence of proprietary traffic also need to be respected. Therefore, in some embodiments, some impact on the live traffic will still likely occur, but the impact is to be minimized or at least be knowingly imposed in order to yield proper test results. The impact will likely be measured against a given Service Level Agreement (SLA) valid on the affected network or the affected network segment. However, in some cases it may not be permissible to affect live traffic and, in such an exemplary embodiment, the sequence of proprietary traffic will not be injected if it is known to adversely affect the live traffic (e.g., in order to respect a given SLA on the network or the network segment).

In the example illustrated in FIG. 1, the test device 1000 receives inline power connectivity from the network node via an inline power module 1050 of the node-side interface 1210 and provides inline power connectivity to a network device (not shown) via an inline power module 1060 of the network-side interface 1230.

In the example illustrated in FIG. 1, the node-side interface 1210, the network-side interface 1230 and, as illustrated, the queue manager 1220 are implemented in a static partition 1200 of a programmable logic device 1100 and the test module 1310 is implemented at least in part in a reprogrammable partition 1300 of the programmable logic device 1100. The controller module 1250 provides the necessary logical means to perform various tasks of the test device 1000 and could also be used to provide routine functions best implemented in such a module. A reprogramming module 1240 is also illustrated in FIG. 1 as implemented in the static partition 1200 of the programmable logic device 1100. The test device 1000 may optionally receive reprogramming data (e.g., such as a FPGA bit stream in the test request) and the reprogramming module 1240 may then further optionally reprogram at least a portion of the reprogrammable partition 1300 in accordance with the reprogramming data. The reprogrammed test device may then further acknowledge (not shown) completion of the reprogramming (e.g., to the sender of the reprogramming data or, if different, to a test management system). The sequence of proprietary traffic may further be generated by the test module 1310 after reprogramming of the reprogrammable partition 1300.

Following the generation of the sequence of proprietary traffic, the test module 1310 may also receive a response directed to the address. The response may further relate only to a network segment (not shown) of the segment. The test module 1310 may also optionally further treat the response and send a test result to an issuer (not shown) of the test request (e.g. a test management system). The sequence of proprietary traffic may additionally comprise further reprogramming data addressed to a further address of a further test module (not shown) in a further test device (not shown), in which case the test module 1310 can forward the reprogramming data to the further device, with the expectation that it will be used to reprogram the further device in view of the related sequence of proprietary traffic.

The sequence of proprietary traffic may be injected on a subset of the traffic flows on the segment without interrupting other traffic flows from the plurality of traffic flows that are not part of the subset. This is particularly useful for in-service testing scenarios. The sequence of proprietary traffic may also be injected on a new traffic flow on the segment without interrupting the other traffic flows. This is particularly useful for service turn-up scenarios.

In one exemplary embodiment, a reprogrammable test device is provided. The reprogrammable test device is connectable in a network node of a network conveying a plurality of traffic flows and comprises a first interface for receiving the plurality of traffic flows on a first segment of the network and a second interface for forwarding the plurality of traffic flows received from the first interface towards a second segment of the network. The reprogrammable test device further comprises a test module, reachable via an address on the network, implemented at least in part on a reprogrammable partition of a programmable logic device of the test device, for performing at least one test function on the plurality of traffic flows and a reprogramming module, implemented on a static partition of the programmable logic device, for reprogramming at least a portion of the reprogrammable partition implementing the test module, in accordance with reprogramming data received at the test device. In one exemplary embodiment, the reprogrammable test device receives inline power connectivity from the network node via the first interface and provides inline power connectivity to a network device via the second interface.

The reprogramming data may allow the test module to provide at least one of the following test functions on the traffic flows: traffic flow monitoring, traffic flow mirroring, proprietary traffic injection on the traffic flows and/or proprietary traffic analysis on the traffic flows. The reprogramming data may also allow the test module to provide at least one test function not provided before reprogramming. The reprogramming data may also remove one or more test functions provided by the test module before reprogramming (e.g., and eventually replace all previously available test functions).

The reprogramming module may further acknowledge completion of the reprogramming to at least one of a sender of the reprogramming data and, if different than the sender, a test management system.

A sequence of proprietary traffic may also be generated by the test module after reprogramming comprising further reprogramming data addressed to a further address of a further test device (e.g., allowing a daisy-chain of test device reprogramming).

The first interface and the second interface may further be implemented on the static partition of the programmable logic device.

The test module may further receive a test request directed to the address and cause a sequence of proprietary traffic (e.g., proprietary test traffic) to be injected on the network. The sequence of proprietary traffic may further be generated by the test module after reprogramming of the reprogrammable partition.

Figure 2A:
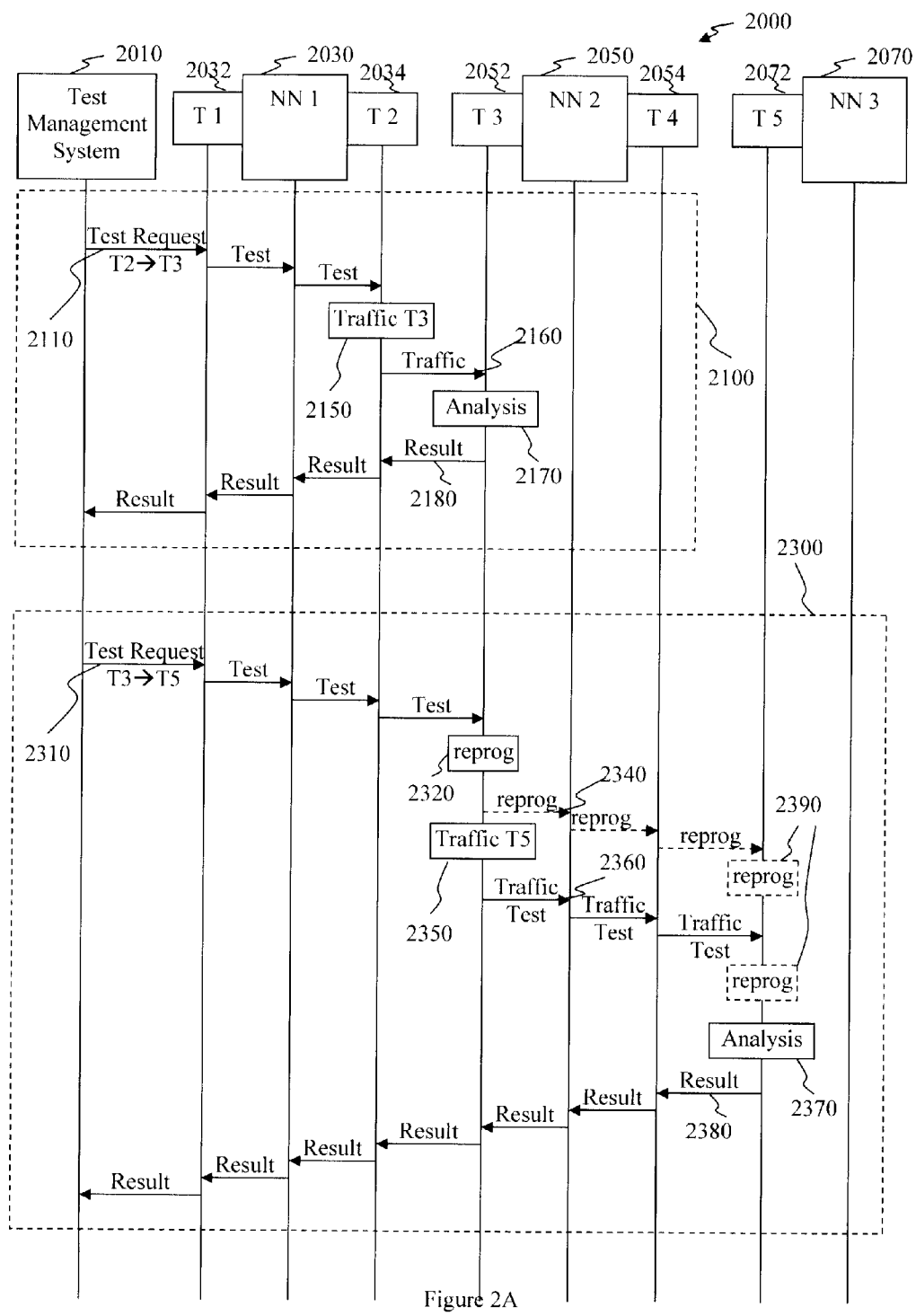
FIG. 2A and FIG. 2B are referred to together as FIG. 2, which is a flow chart and nodal operation diagram illustrating network operations in accordance with an exemplary embodiment.
Figure 2B:
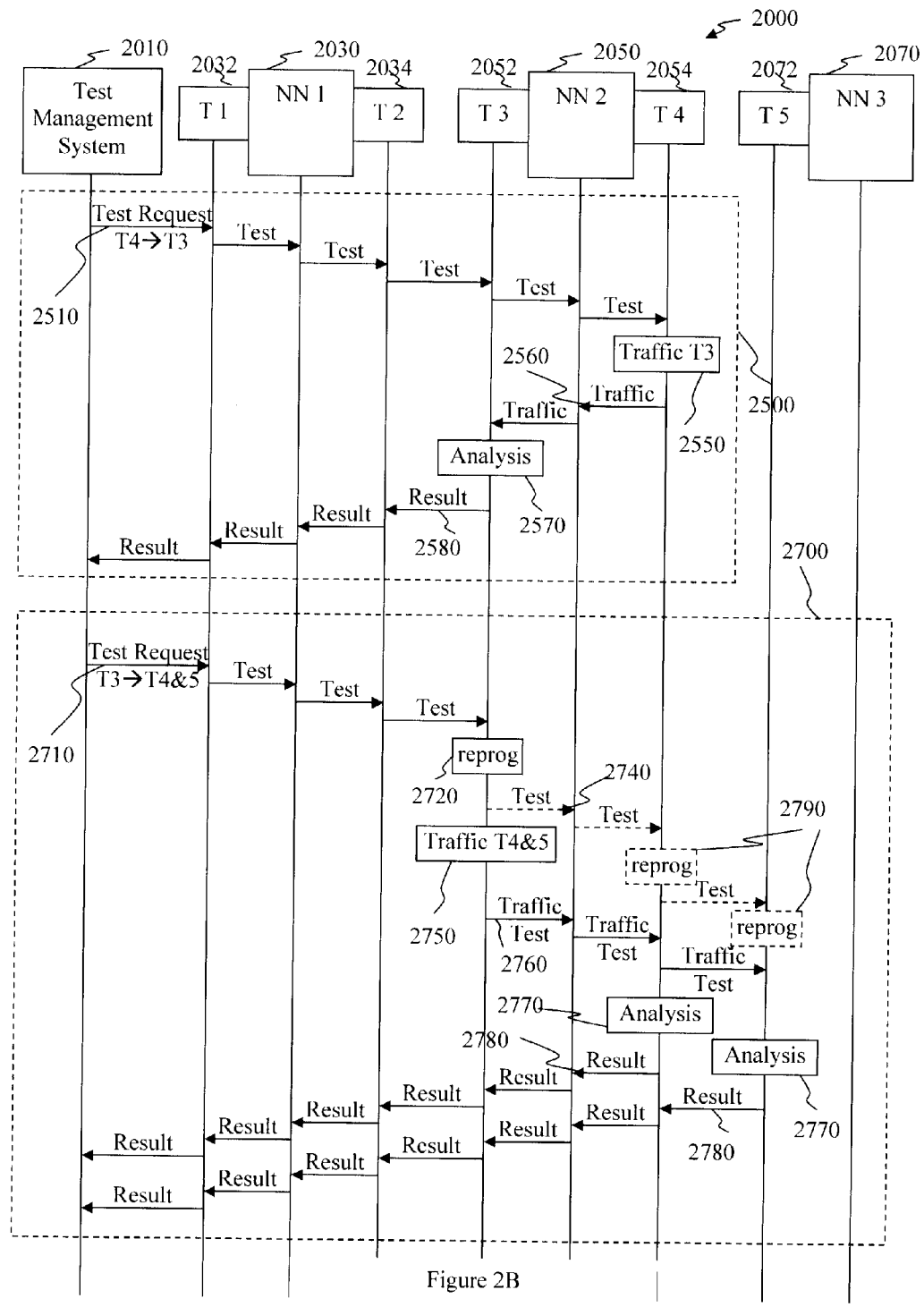

FIG. 2 shows a flow chart and nodal operation diagram 2000 illustrating exemplary network operations that may be performed using the test device 1000 of FIG. 1. The flow chart and nodal operation diagram 2000 of FIG. 2 shows different examples of network operations 2100, 2300, 2500 and 2700 that can be performed. The exemplary network operations are herein exemplified with reference to an exemplary network which makes use of a plurality of the test device 1000 of FIG. 1. The exemplary network of FIG. 2 comprises a Test Management System (TMS) 2010, network nodes NN1 2030, NN2 2050 and NN3 2070. TMS 2010 is a logical representation of various components that are required to manage testing in the exemplary network of FIG. 2.

Skilled persons will readily understand that the network of FIG. 2, for the purpose of clarity and conciseness, shows a limited number of network nodes 2030, 2050 and 2070, but that network implementations in accordance with the present teachings could comprise any number of network nodes. The network of FIG. 2 could be any type of network that requires testing. For instance, the network of FIG. 2 could be an edge network, an access network, a core network or any other type of network. The exemplary network of FIG. 2 shows test devices T1 2032, T2 2034, T3 2052, T4 2054 and T5 2072. The NN1 2030 is shown in communication with the NN2 2050 and, in turn, with the NN3 2070 via their respective test devices, allowing traffic flows to transit on the network of FIG. 2. In the context of the example of FIG. 2, the connection between TMS 2010 and T1 2032 represents a logical connection that likely, but not necessarily, transits through various network equipment (not shown). For the purpose of the example of FIG. 2, T1 2032 needs to have a presence on the network and be reachable by TMS 2010.

The connections between network nodes of the example of FIG. 2 could be of various types, such as an optical link or an Ethernet physical link, or be a logical representation of various physical links. For the purpose of the example of FIG. 2, each respective link between the test devices 2032, 2034, 2052, 2054 and 2072 will be referred to as a "segment".

The example 2100 represents a test request for the segment between T2 2034 and T3 2052. TMS 2010 issues a test request (T2→T3) 2110 and addresses the test request 2110 to T2 2034 (or otherwise addresses the test request 2110 towards T2 2034 so that it can be intercepted by T2 2034). The test request 2110 is forwarded (referred to as test on FIG. 2) and intercepted by T2 2034. T2 2034 receives the test request 2110 and reacts accordingly. In the example 2100, T2 2034 creates a sequence of traffic 2150 for T3 2054 and issues the sequence of proprietary traffic together with relevant information from the test request 2110 (into test traffic 2160 also referred to as traffic or traffic test on FIG. 2). For instance, the traffic 2160 contains the sequence of proprietary traffic 2150 and the address of the issuer of the test request, i.e., TMS 2010 in the example 2100. T3 2052 receives the traffic 2160 and reacts accordingly. In the example 2100, T3 2052 performs an analysis 2170 of the traffic 2160 and issues a test result 2180 that is addressed back to the issuer of the test request 2110, i.e., TMS 2010 in the example 2100.

The example 2300 represents a test request for the segments between T3 2052 and T5 2072. TMS 2010 issues a test request (T3→T5) 2310 and addresses the test request 2310 to T3 2052 (or otherwise addresses the test request 2310 towards T3 2052 so that it can be intercepted by T3 2052). The test request 2310 is forwarded (referred to as test on FIG. 2) and intercepted by T3 2052. T3 2052 receives the test request 2310 and reacts accordingly. In the example 2300, the test request 2310 contains reprogramming data (e.g., an FPGA bit stream) for T3 2052 to reprogram itself as a test transmitter 2320 to handle the test request 2310. This reprogramming data is specific to the test to be performed by T3 2052 in accordance with the test request 2310. T3 2052 may then further acknowledge (not shown) completion of the reprogramming (e.g., to the sender (T2 2034) or to TMS 2010). T3 2052, as reprogrammed, then creates a sequence of traffic 2350 for T5 2072. T3 2052 then issues the sequence of proprietary traffic together with relevant information from the test request 2310 (into traffic 2360 also referred to as traffic or traffic test on FIG. 2). For instance, the traffic 2360 contains the sequence of proprietary traffic 2350, the reprogramming data from the test request 2310 and the address of the issuer of the test request, i.e., TMS 2010 in the example 2300. Alternatively, the reprogramming data from the test request 2310 could also be sent in a separate reprogramming message 2340 (which could be a forwarded version of the test request 2310) towards T5 2072. T5 2072 receives the traffic 2360, and/or the separate reprogramming message 2340 and reacts accordingly (e.g., by reprogramming itself 2390 if reprogramming data is received). If the separate reprogramming message 2340 is used, it may be issued by T3 2052 as shown or by TMS 2010 (not shown). T3 2052 or TMS 2010 may further wait for an acknowledgment (not shown) of the reprogramming of T5 2072 before proceeding with or otherwise allowing the traffic 2360.

In the example 2300, upon receipt of the reprogramming data, T5 2072 reprograms itself (e.g., as a test analyzer) 2390 to perform an analysis 2370 of the traffic 2360. Again, the reprogramming data for T5 2072 is specific to the test to be performed by T5 2072 in accordance with the test request 2310. T5 2072, as reprogrammed, performs the analysis 2370 of the traffic 2360 and issues a test result 2380 that is addressed back to the issuer of the test request 2310, i.e., TMS 2010 in the example 2300.

The example 2500 represents a test request for the segment between T4 2054 and T3 2052 (which could be referred to as a backward test). TMS 2010 issues a test request (T4→T3) 2510 and addresses the test request 2510 to T4 2054 (or otherwise addresses the test request 2510 towards T4 2054 so that it can be intercepted by T4 2054). The test request 2510 is forwarded (referred to as test on FIG. 2) and intercepted by T4 2054. T4 2054 receives the test request 2510 and reacts accordingly. In the example 2500, T4 2054 creates a sequence of traffic 2550 for T3 2054 and issues the sequence of proprietary traffic together with relevant information from the test request 2510 (into traffic 2560 also referred to as traffic or traffic test on FIG. 2). For instance, the traffic 2560 contains the sequence of proprietary traffic 2550 and the address of the issuer of the test request, i.e., TMS 2010 in the example 2500. T3 2052 receives the traffic 2560 and reacts accordingly. In the example 2500, T3 2052 performs an analysis 2570 of the traffic 2560 and issues a test result 2580 that is addressed back to the issuer of the test request 2510, i.e., TMS 2010 in the example 2500.

The example 2700 represents a test request for the segments between T3 2052, and T4 2054 and T5 2072. TMS 2010 issues a test request (T3→T4 & T5) 2710 and addresses the test request 2710 to T3 2052 (or otherwise addresses the test request 2710 towards T3 2052 so that it can be intercepted by T3 2052). The test request 2710 is forwarded (referred to as test on FIG. 2) and intercepted by T3 2052. In the example 2700, the test request 2710 contains reprogramming data (e.g., an FPGA bit stream) for T3 2052 to handle the test request 2710. T3 2052 receives the test request 2710 and reacts accordingly. In the example 2700, T3 2052 reprograms itself appropriately 2720 and then also creates a sequence of traffic 2750 for T4 2054 and T5 2072. T3 2052 then issues the sequence of proprietary traffic together with relevant information from the test request 2710 (into traffic 2760 also referred to as traffic or traffic test on FIG. 2). For instance, the traffic 2760 contains the sequence of proprietary traffic 2750 and the address of the issuer of the test request, i.e., TMS 2010 in the example 2700. In the example 2700, the reprogramming data from the test request 2710 is sent in a reprogramming message 2740 (which could be a forwarded version of the test request 2710) towards T4 2054 and T5 2072. T4 2054 and T5 2072 respectively receive the reprogramming message 2740 and reacts accordingly. In the example 2700, upon receipt of the reprogramming data, T4 2054 and T5 2072 reprogram themselves. Upon receipt of the traffic 2760, T4 2054 and T5 2072 respectively perform an analysis 2770 of the traffic 2760 and respectively issue test results 2780 that are addressed back to the issuer of the test request 2710, i.e., TMS 2010 in the example 2700.

The examples 2100, 2300, 2500 and 2700 of FIG. 2 show interactions between a plurality of test devices 2032, 2034, 2052, 2054 and 2072 in accordance with instructions from TMS 2010 in order to perform test routines. Skilled persons will readily recognize that a sequence of proprietary traffic (e.g., proprietary test traffic) to be treated in one or more of the test devices could be issued from any device (not shown) and not just a test device, including a device outside the network 2000. Likewise, one or more of the test devices could issue a sequence of proprietary traffic (e.g., proprietary test traffic) addressed to any device (not shown) and not just another test device, including a device outside the network 2000.

Figure 3:
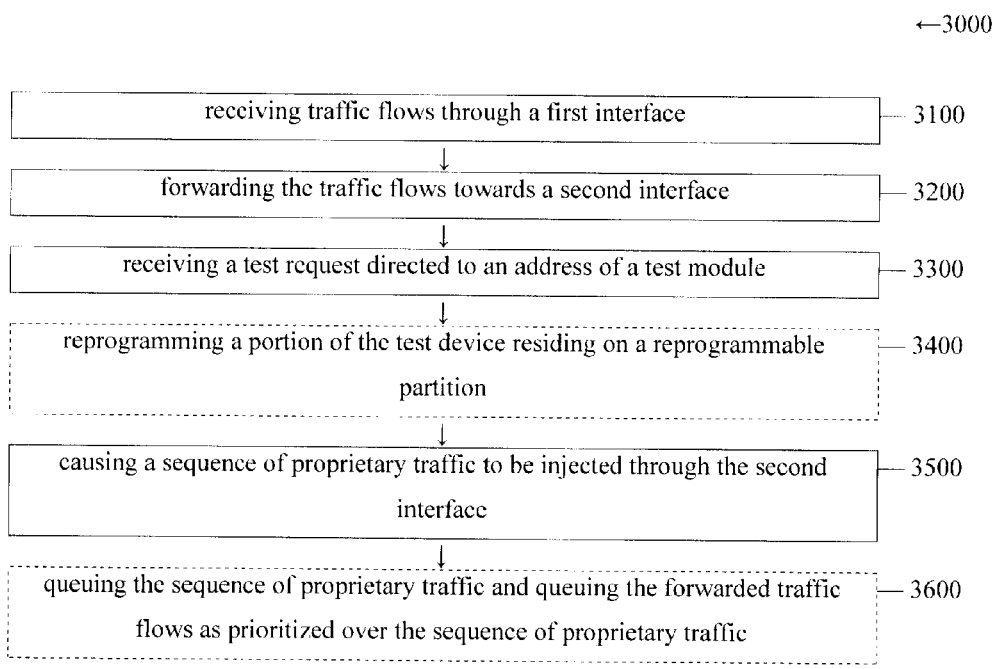
FIG. 3 is a flow chart of a method in accordance with an exemplary embodiment.

FIG. 3 shows a flow chart of a method 3000 in accordance with an exemplary embodiment. The method 3000 is for performing testing in a network conveying a plurality of traffic flows. The network comprises a network node in which a test device is connected. The method 3000 comprises, at the test device, receiving the plurality of traffic flows through a first interface of the test device on a first segment of the network 3100 and forwarding the plurality of traffic flows received from the first interface towards a second segment of the network through a second interface of the test device 3200. The method also comprises, at the test device, receiving a test request directed to an address of a test module of the test device 3300. Optionally, the first interface, the second interface and, if present, a queue manager may be further implemented on a static partition of a programmable logic device in the test device, and a test module may be further implemented at least in part on a reprogrammable partition of the programmable logic device. The method may then further optionally comprise, reprogramming at least a portion of the reprogrammable partition in accordance with the reprogramming data 3400. In response to the test request, the method follows with causing a sequence of proprietary traffic (e.g., proprietary test traffic) to be injected on the network 3500.

Optionally, the method may also comprise, in the test device, receiving the traffic flows from the first interface and the sequence of proprietary traffic from the test module in the queue manager and directing the plurality of traffic flows and the sequence of proprietary traffic to the second interface from the queue manager while minimizing involuntary network degradation for the plurality of traffic flows 3600.

A method is generally conceived to be a self-consistent sequence of steps leading to a desired result. These steps require physical manipulations of physical quantities. Usually, though not necessarily, these quantities take the form of electrical or electromagnetic signals capable of being stored, transferred, combined, compared, and otherwise manipulated. It is convenient at times, principally for reasons of common usage, to refer to these signals as information, bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration and is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses. Figures are not drawn to scale.

What is claimed is:

1. A test device connectable in a network node of a network conveying a plurality of live traffic flows, the test device comprising:
   a first interface for receiving the plurality of live traffic flows on a first segment of the network;
   a second interface for forwarding the plurality of live traffic flows received from the first interface towards a second segment of the network; and
   a test module reachable via an address on the network, wherein the test module:
     receives a test request directed to the address; and
     generates a sequence of proprietary traffic, the sequence of proprietary traffic to be injected on the network in addition to the plurality of live traffic flows.

2. The test device of claim 1, further comprising a queue manager that:
   receives the plurality of live traffic flows from the first interface;
   receives the sequence of proprietary traffic from the test module; and
   directs the plurality of live traffic flows and the sequence of proprietary traffic to the second interface while minimizing involuntary network degradation for the plurality of live traffic flows.

3. The test device of claim 1, wherein the test device receives inline power connectivity from the network node via the first interface and provides inline power connectivity to a network device via the second interface.

4. The test device of claim 1, wherein the first interface and the second interface are further implemented on a static partition of a programmable logic device and the test module is further implemented at least in part on a reprogrammable partition of the programmable logic device.

5. The test device of claim 2, wherein the first interface, the second interface and the queue manager are further implemented on a static partition of a programmable logic device and the test module is further implemented at least in part on a reprogrammable partition of the programmable logic device.

6. The test device of claim 5, wherein the test device further comprises a reprogramming module implemented on the static partition of the programmable logic device, the test request received at the test module further comprising reprogramming data and the reprogramming module further reprogramming at least a portion of the reprogrammable partition in accordance with the reprogramming data, wherein the sequence of proprietary traffic is further generated by the test module after reprogramming of the reprogrammable partition.

7. The test device of claim 1, wherein the first interface receives the plurality of live traffic flows on the first segment from the network node.

8. The test device of claim 1, wherein the sequence of proprietary traffic further comprises further reprogramming data addressed to a further address of a further test module in a further test device.

9. The test device of claim 1, wherein the test module receives a further sequence of proprietary traffic.

10. The test device of claim 1, wherein the sequence of proprietary traffic is injected on:
    a subset of the plurality of live traffic flows on the second segment without interrupting other traffic flows from the plurality of live traffic flows that are not part of the subset; or
    a new traffic flow on the second segment without interrupting the plurality of live traffic flows.

11. A method for performing testing in a network conveying a plurality of live traffic flows, the network comprising a network node in which a test device is connected, the method comprising:
    at the test device, receiving the plurality of live traffic flows through a first interface of the test device on a first segment of the network;
    at the test device, forwarding the plurality of live traffic flows received from the first interface towards a second segment of the network through a second interface of the test device;
    at the test device, receiving a test request directed to an address of a test module of the test device; and
    in response to the test request, generating a sequence of proprietary traffic, the sequence of proprietary traffic to be injected on the second segment in addition to the plurality of live traffic flows.

12. The method of claim 11, further comprising:
    in the test device, receiving the plurality of live traffic flows from the first interface and the sequence of proprietary traffic from the test module in a queue manager; and
    in the test device, directing the plurality of live traffic flows and the sequence of proprietary traffic to the second interface from the queue manager while minimizing involuntary network degradation for the plurality of live traffic flows.

13. The method of claim 11, further comprising:
    at the test device, receiving inline power connectivity from the network node via the first interface; and
    at the test device, providing inline power connectivity to a network device via the second interface.

14. The method of claim 11, wherein the first interface and the second interface are further implemented on a static partition of a programmable logic device in the test device and the test module is further implemented at least in part on a reprogrammable partition of the programmable logic device.

15. The method of claim 12, wherein the first interface, the second interface and the queue manager are further implemented on a static partition of a programmable logic device of the test device and the test module is further implemented at least in part on a reprogrammable partition of the programmable logic device.

16. The method of claim 14, further comprising:
at the test device, receiving reprogramming data in the test request; and
in the test device, reprogramming at least a portion of the reprogrammable partition in accordance with the reprogramming data;
wherein causing a sequence of proprietary traffic to be injected on the second segment further comprises generating the sequence of proprietary traffic in the test module after reprogramming of the reprogrammable partition.

17. The method of claim 11, wherein receiving the plurality of live traffic flows further comprises receiving the plurality of live traffic flows from the network node.

18. The method of claim 11, further comprising receiving further reprogramming data in the test request and forwarding the further test request to a further address of a further test module in a further test device.

19. The method of claim 11, further comprising receiving a further sequence of proprietary traffic at the test device.

20. The method of claim 11, further comprising, at the test device, injecting the sequence of proprietary traffic on:
a subset of the plurality of live traffic flows on the second segment without interrupting other traffic flows from the plurality of live traffic flows that are not part of the subset; or
a new traffic flow on the second segment without interrupting the plurality of live traffic flows.

21. A test device connectable in a network node of a network conveying a plurality of live traffic flows, the test device comprising:
a first interface for receiving the plurality of live traffic flows on a first segment of the network;
a second interface for forwarding the plurality of live traffic flows received from the first interface towards a second segment of the network;
a test module, reachable via an address on the network, implemented at least in part on a reprogrammable partition of a programmable logic device of the test device, for performing at least one test function on the plurality of traffic flows, wherein the test module generates a sequence of proprietary traffic, the sequence of proprietary traffic to be injected on the network in addition to the plurality of live traffic flows; and
a reprogramming module, implemented on a static partition of the programmable logic device, for reprogramming at least a portion of the reprogrammable partition implementing the test module, in accordance with reprogramming data received at the test device.

22. The test device of claim 21, wherein the test device receives inline power connectivity from the network node via the first interface and provides inline power connectivity to a network device via the second interface.

23. The test device of claim 21, wherein the reprogramming data allows the test module to provide at least one of the following test function on the traffic flows:
traffic flow monitoring;
traffic flow mirroring;
proprietary traffic injection on the traffic flows; and
proprietary traffic analysis on the traffic flows.

24. The test device of claim 21, wherein the reprogramming data allows the test module to provide at least one test function not provided before reprogramming.

25. The test device of claim 21, wherein at least one test function provided by the test module before reprogramming is not available after reprogramming.

26. The test device of claim 21, wherein the reprogramming module is further for acknowledging completion of the reprogramming to at least one of a sender of the reprogramming data and, if different then the sender, a test management system.

27. The test device of claim 21, wherein a sequence of proprietary traffic, generated by the test module after reprogramming, comprises further reprogramming data addressed to a further address of a further test device.

28. The test device of claim 21, wherein the first interface and the second interface are further implemented on the static partition of the programmable logic device.

29. The test device of claim 21, wherein the test module receives a test request directed to the address and causes a sequence of proprietary traffic to be injected on the network.

30. The test device of claim 29, wherein the sequence of proprietary traffic is further generated by the test module after reprogramming of the reprogrammable partition.

31. A test device connectable in a network node of a network conveying a plurality of traffic flows, the test device comprising:
a first interface for receiving the plurality of traffic flows on a first segment of the network;
a second interface for forwarding the plurality of traffic flows received from the first interface towards a second segment of the network;
a test module reachable via an address on the network, wherein:
the test module is implemented at least in part on a reprogrammable partition of a programmable logic device;
at least a portion of the reprogrammable partition is being reprogrammed in accordance with reprogramming data received via the network, the reprogramming data allowing for addition and/or removal of a test function from the test module;
the test module receives a test request directed to the address; and
the test module generates causes a sequence of proprietary traffic to be injected on the network;
a queue manager for directing the plurality of traffic flows received from the first interface towards the second interface and ensuring continued treatment of live traffic flows while the test module is being reprogrammed.

* * * * *